(No Model.) 2 Sheets—Sheet 1.
J. L. LEEPER.
BICYCLE.
No. 420,578. Patented Feb. 4, 1890.
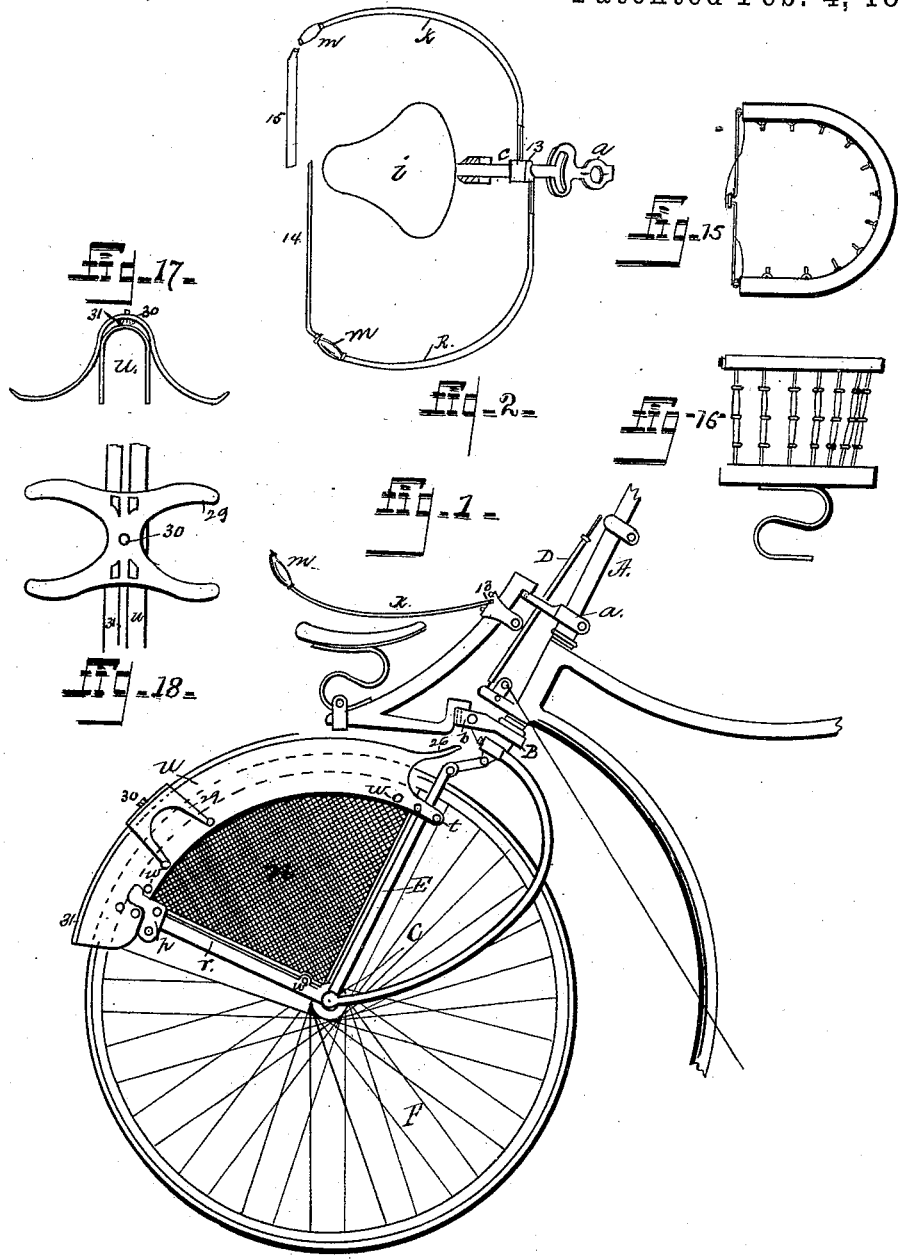

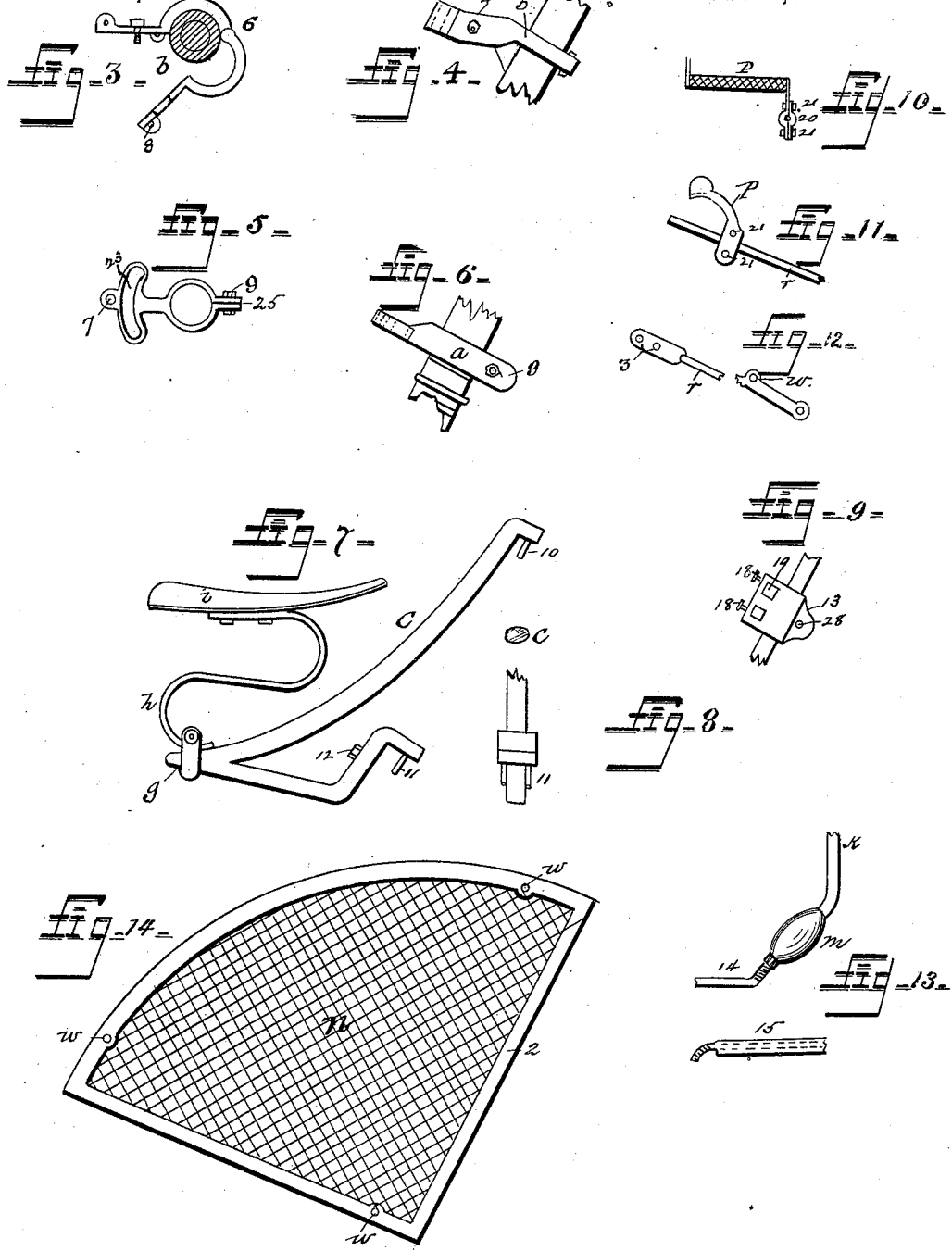

UNITED STATES PATENT OFFICE.

JAMES L. LEEPER, OF FORT WAYNE, INDIANA.

BICYCLE.

SPECIFICATION forming part of Letters Patent No. 420,578, dated February 4, 1890.

Application filed May 25, 1889. Serial No. 312,185. (No model.)

*To all whom it may concern:*

Be it known that I, JAMES L. LEEPER, a citizen of the United States, residing at Fort Wayne, county of Allen, and State of Indiana, have invented a new and useful Improvement in Bicycles, of which the following is a full and exact description, reference being had to the accompanying drawings, which are a part of this specification.

My invention relates to that class of bicycles having wheels of the same or nearly the same size as the "Victor Safety" bicycle, the "Veloce Columbia" bicycle, and the "American Rambler," and all other rear-driving safety-bicycles.

The objects of my invention are, first, to provide a seat on which a child, encircled by sliding and adjustable handle-bars or hand-rests, can ride securely on a bicycle in front of the steering-shaft without danger of contact with the steering-wheel and without interfering with the free movements of the machine; and, second, to enable an adult of either sex to ride over the front wheel of a bicycle in front of the steering-shaft without using pedals, or otherwise assisting in either the steering or the propelling of the machine, on a seat attached to the steering-shaft in such a manner as to adjust itself automatically to the movements of the steering-wheel. These objects are attained by the mechanism illustrated in the accompanying drawings, in which—

Figure 1 is a side view of the steering shaft or head and steering-wheel of a bicycle, with my entire improvement, the bicycle extension-seat attached, showing bracket, handle bars or rests, seat, and mud-guard with foot-rest. Fig. 2 is a top view of the seat and handle-bars or hand-rests with bracket. Fig. 3 is a top view of the bracket with a folding hinge, which receives the steering-shaft at the fork. Fig. 4 is a side view of the same bracket adjusted to steering-shaft. Fig. 5 is a top view of the bracket through which the brake-rod passes, and which with bracket, Fig. 3, secures bracket c, with seat and handle-bars attached to the steering-shaft. Fig. 6 is a side view of the same bracket adjusted to the shaft. Fig. 7 is a side view of the seat and bracket on which the seat rests and to which it is attached by means of a spring. Fig. 8 is another view of the lower part of bracket c in Fig. 7, showing the two pins which fit into 8 and 8 of Fig. 3. Fig. 9 is the clip which adjusts and fastens the handle-bars and hand-rests to the curved bracket c in Fig. 7, showing the square sockets into which the handle-bars pass and in which they are secured by means of set-screws 18 18. Fig. 10 is the foot-rest on the mud-guard, showing the set-screws 21 21, which adjust and fasten it on rod r, Fig. 1, and the hole through which rod r passes. Fig. 11 is another view of the foot-rest, showing a portion of the rod to which it is fastened and the curve with which it is made, designed to throw the foot, if desired, at or beyond the circumference of the wheel. Fig. 12 shows two sections of the rod r in Fig. 1 with the rivets by which the mud-guard is fastened on the lower side. Fig. 13 is two sections of the handle-bar or hand-rest, showing the thread and the hollow portion of the bar. Fig. 14 is that section of the mud-guard made of wire screen and fastened in a frame. Fig. 15 is a top view of the chair-like seat for a child to replace the saddle-seat at pleasure. Fig. 16 is a side view of the same with spring attached at the bottom. Fig. 17 is a front view of the mud-guard u with skirt-guard attached. Fig. 18 is a top view of the same.

Similar letters refer to similar parts throughout the several views.

Referring now to Fig. 1, the frame-work of the invention consists of a bracket c with the seat i and handle-bars k k, and the devices a and b by which they are secured to the steering-shaft and to each other, also a mud-guard u with a screen n and a foot-rest P.

The L-shaped bracket c, (see Fig. 7,) to which the seat is attached at g, is firmly secured at A and B, Fig. 1, to that part of the steering-shaft extending from the handle-bar of the bicycle to the fork, which is moved by said handle-bar in steering. By this method of attachment the seat moves automatically with the steering-wheel and keeps the seat and its occupant at all times directly over the wheel, otherwise there would be an interference in the movements of the machine and the safety of the riders would be endangered. The seat is a saddle, Fig. 7, fastened to a spring $h$, which is secured to the bracket $c$ at $g$ by clip $g$. This saddle may be removed at pleasure and a chair-like seat, Fig. 16, substituted for small children. The seat is encircled by two handle bars or rests $k\ k$, Fig. 2, which are adjustable to move laterally to and from the seat. They are firmly received in square sockets, Fig. 9, by means of set-screws 18 18, Fig. 9. The clip 13, Fig. 1 in which these handle-bars are inserted is adjustable up and down on bracket $c$, Fig. 1, to which it is firmly fastened by a set-screw 28, Fig. 9.

The handles $m$, Fig. 2, turn upward to suit the natural position of the hands. The handle-bars $k\ k$, Fig. 2, pass through handles $m\ m$, which are hollow with a thread to receive bars 14 and 15. (See also Fig. 13.) Bar 15 is hollow (see 15, Fig. 13) and receives bar 14, thus completely encircling the occupant of the seat.

The L-shaped bracket $c$, Fig. 1, to which the seat and handle-bars heretofore described are attached, is firmly fastened to the steering-shaft at A and B, Fig. 1, by two devices, Figs. 3 and 5. This bracket $c$ is fastened at B, Fig. 1, by a bracket with a folding hinge, which is rigidly adjusted to the steering-shaft at B by means of a set-screw 4, Fig. 3. This bracket, Fig. 3, has also two round sockets 8 8 to receive the pins 11, Figs. 7 and 8.

The top of bracket $c$, Fig. 1, is securely fastened to the steering-shaft at A by means of a bracket or device, which is made to slip onto the steering-shaft when the handle-bar is removed. It is then fastened firmly to the shaft by means of a set-screw 9, Fig. 5. This bracket also has an opening 23, Fig. 5, for the free movement of the brake-rod D, Fig. 1, which does not move with the steering-shaft. This bracket also has a round socket 7, Fig. 5, into which is fitted the pin 10, Fig. 7.

The occupant of the seat heretofore described is protected from the wheel by a light shield or mud-guard consisting of two parts—shield $u$, a screen $n$, Fig. 1, and a skirt-guard 29, Figs. 17 and 18.

The shield or guard $u$ consists of thin sheet metal screwed upon rod 31, Fig. 1, from the under side, and also is fastened to rod $r$ at 3 in Figs. 1 and 12, and also to fork E at $t$, Fig. 1, curving upward at 26. The wire-gauze $n$ is framed (see Fig. 14) and fastened to guard $u$ and rod $r$ by rivets at $w\ w$ and $w$, Fig. 1. Rod $r$ is also secured to axle C.

Skirt-guard 29, Fig. 18, consists of one piece of metal with four curved arms and fastened to rod 31 by means of set-screw 30, Figs. 17 and 18, and also by means of pieces of itself partially cut out and turned downward so as to fit firmly around rod 31, Fig. 1.

The foot-rest, Fig. 10, is adjustable on rod $r$, Fig. 1. (See also Fig. 11.) It is fastened to rod $r$ by two set-screws 21 21 in Plate 20, Fig. 10. The foot-rest is made with a curve to throw it outward to the circumference of the wheel for the convenience of a lady rider.

What I claim as my invention, and desire to secure by Letters Patent, is—

1. The combination, with the steering-shaft of a bicycle, of a hinged bracket having pins which are connected in bearings of said shaft, and a seat with an S-shaped spring removably secured to said bracket, substantially as specified.

2. The combination, with the steering-shaft of a bicycle having bearings secured thereto, of the swinging bracket connected to said bearings, and the adjustable handles mounted on said bracket, substantially as and for the purposes specified.

3. The combination, in a bicycle having the steering-shaft, of the bracket connected to said shaft and laterally movable thereon, a removable seat on said bracket, a mud-guard, a curved skirt-guard mounted on a rod and secured to the mud-guard, and a screen secured to the mud-guard and to a rod $r$, substantially as specified.

4. The combination, with the bracket removably secured to the steering-shaft of a bicycle and extending over the driving-wheel thereof and adjustable with the movements of said wheel, of the removable seat and spring attached to said bracket by means of a suitable clip, substantially as and for the purposes set forth.

5. The combination, in a bicycle, of the bracket secured to the steering-shaft thereof and adapted to have movement with the wheel of the bicycle, and the outwardly-curved adjustable foot-rests mounted on the forward ends of the rods $r$, substantially as specified.

6. In a bicycle, the combination, with the steering-shaft, of the clamps $a$ and $b$, loosely secured to bearings on said shaft and having openings at their rear portions, and the seat with a spring secured to the lower end of the bracket, as set forth.

JAMES L. LEEPER.

Witnesses:
JOHN MORRIS, Jr.,
L. H. COOPER.